June 30, 1931.                A. O. JAEGER                1,812,341
                            CATALYTIC APPARATUS
                           Filed Feb. 4, 1930          4 Sheets-Sheet 1

FIG. 1.

INVENTOR
Alphons O. Jaeger
BY Robert Ames Norton
ATTORNEY

June 30, 1931.　　　A. O. JAEGER　　　1,812,341
CATALYTIC APPARATUS
Filed Feb. 4, 1930　　　4 Sheets-Sheet 2

INVENTOR
Alphons O. Jaeger
BY Robert Ames Norton
ATTORNEY

June 30, 1931.  A. O. JAEGER  1,812,341
CATALYTIC APPARATUS
Filed Feb. 4, 1930  4 Sheets-Sheet 3

INVENTOR
Alphons O. Jaeger
BY Robert Ames Norton
ATTORNEY

June 30, 1931.  A. O. JAEGER  1,812,341
CATALYTIC APPARATUS
Filed Feb. 4, 1930    4 Sheets-Sheet 4

INVENTOR
Alphons O. Jaeger
BY Robert Ames Norton
ATTORNEY

Patented June 30, 1931

1,812,341

UNITED STATES PATENT OFFICE

ALPHONS O. JAEGER, OF MOUNT LEBANON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

CATALYTIC APPARATUS

Application filed February 4, 1930. Serial No. 425,831.

This invention relates to process and apparatus for the carrying out of vapor phase catalytic reactions and more particularly to apparatus for reactions which are strongly exothermic or which require delicate temperature control.

While the apparatus of the present invention is applicable to all vapor phase catalytic reactions, both exothermic and endothermic, it is particularly important in highly exothermic or delicate reactions and in its more specific aspects it will be described in connection with such reactions. However, it is generally applicable, and the following reactions are given as typical examples of vapor phase reactions in which the principles of the present invention can be effectively utilized:

1. Reactions in which an intermediate oxidation product is produced. The oxidation of benzol, toluol, phenol, tar phenols or furfural and other compounds containing the group $-CH_2-CH=CH-CH_2-$ to maleic acid and fumaric acid or mesotartaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid; phthalic anhydride to maleic acid and fumaric acid; anthracene to anthraquinone; phenanthrene to phenanthraquinone, diphenic acid, phthalic anhydride and maleic acid, acenaphthene to acenaphthylene, acenaphthaquinone, bisacenaphthylidenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like.

2. Reactions in which an undesired impurity is burned out, such as the purification of crude anthracenes of various degrees of impurity with total combustion of carbazole, dead oils and in some cases phenanthrene; purification of crude naphthalenese and crude mononuclear hydrocarbons, such as benzols and the like; purification of ammonia from coal tar with the burning out of the organic impurities such as phenolic bodies present, etc.

3. Oxidation of mixtures of organic compounds to desired intermediate products with removal of impurities such as the oxidation of crude anthracenes, phenanthrenes, and the like to intermediate products such as anthraquinone, phenanthraquinone, diphenic acid, phthalic anhydride, and the like with concomitant removal of carbazole and dead oils by total combustion; the oxidation of crude tar acids to maleic and fumaric acids with the combustion of certain impurities, etc.

Reductions and hydrogenations, such as reducing nitro compounds, for example nitrobenzene, dinitrobenzene, nitrophenol, nitronaphthalene and their homologues to the corresponding amines or the corresponding hydrogenated amines, the reduction of aldehydes and ketones to alcohols, such as benzaldehyde to benzyl alcohol, acetaldehyde to ethyl alcohol, crotonaldehyde to the corresponding butyl alcohol, and the like, the reduction of oxides of carbon to methanol, methane, higher alcohols and ketones or petroleum-like products, the hydrogenation of aromatic compounds to alicyclic compounds such as benzene to cyclohexane, naphthalene to tetraline or decaline, anthracene to hydrogenated anthracenes, phenol to cyclohexanol, acetylene to ethylene and ethane, and the like, polybasic acids to inner esters, such as phthalic anhydride to phthalid, camphoric acid to campholid, and the like, reduction of nitrogen containing heterocyclic compounds to aliphatic amines such as phridine to amylamine are also of importance.

In addition to reactions in which a more or less homogeneous raw material is reduced, certain mixtures of raw materials may be effectively reduced with or without the presence of additional reducing gases. Thus, for example, oxides of carbon may be reduced in the presence of the vapors of many organic compounds. For example, they may be reduced in the presence of aliphatic hydrocarbons, such as paraffins, olefines, acetylenes, hydrocarbons having the formula $C_nH_{2n-4}$, $C_2H_{2n-6}$, etc. Hydrogen may be present or absent, and the class of products obtained, such as mixtures of oxygenated compounds, or in many cases oils which are predominately hydrocarbon in their nature, will vary with the amount of the reacting ingredients and with the contact masses and reaction conditions used, and it is an advantage of the present invention that these novel combined reductions can be carried out in the desired direction with great effectiveness by the incorporation of suitable stabilizer promoters or stabilizers in the contact masses.

Another class of combined reaction consists in the reduction of oxides of carbon with or without hydrogen in the presence of vapors of aliphatic alcohols, such as paraffin alcohols having the formula $C_nH_{2n}+OH$, or unsaturated alcohols having the formula $C_nH_{2n-1}OH$, or $C_nH_{2n-3}OH$, etc. Polyvalent alcohols such as glycol, glycerol and the like, may be reduced in combination with oxides of carbon with or without hydrogen.

Oxidation products of alcohols, such as, for example, saturated or unsaturated aldehydes and ketones, or oxidation products of polyvalent alcohols, such as glycolaldehydes, glyoxal, glyoxylic acid, oxalic acid, and the like, may be used for vapor phase reductions in the presence of oxides of carbon and hydrogen. Oxidation products of trivalent alcohols and divalent isomeric alcohols may also be used, of course only where it is possible to obtain the vapors of the compounds without undesired decomposition.

Aliphatic acids form another important class of compounds which can be reduced in combination with oxides of carbon. The acids include fatty acids, oxyacids, lactones, polybasic acids, ketone acids, and the like. Other miscellaneous aliphatic carbonyl compounds such as aldehyde alcohols, diketones, triketones, oxymethylene ketones, ketone aldehydes, ketone alcohols and the like, may also be combined with oxides of carbon and reduced in the presence of the contact mass described above to form many valuable products.

In addition to compounds of the aliphatic series which may be reduced together with oxides of carbon, various compounds of the alicyclic series, such as, for example, alicyclic compounds, for instance, cycloparaffins, cycloolefines, cyclodiolefines may be obtained with oxides of carbon and reduced. Examples of specific members of this class are cyclohexane, cyclopentadiene, dicyclopentadiene, and the like. Of course alicyclic carbonyl compounds, such as cyclohexanol, cyclohexanone, etc., may be used, it being understood in this connection and throughout the specification that any compound containing the CO group, irrespective of whether the oxygen is united to carbon with a single or a double bond, are included under the term carbonyl compounds.

Aromatic compounds, such as benzene hydrocarbons, naphthalenes, anthracenes, phenanthrenes, phenols, aromatic alcohols, aldehydes, ketones and acids may be reduced in the presence of oxides of carbon and hydrogen, of course only insofar as the products are capable of volatilization without undesired decomposition.

Heterocyclic compounds, such as products containing the furane nucleus, pyrrole bodies, pyrrolidines and the like, may be reduced together with oxides of carbon.

In the inorganic field exothermic catalytic reactions such as the synthesis of ammonia and the oxidation of ammonia to oxides of nitrogen are well suited for the converters of the present invention, which can also be used for the contact sulfuric acid process as it is possible to obtain a temperature gradient which is so necessary for the high reaction velocities, combined with satisfactory conversion and which makes a boiling bath converter so hopelessly unsuited for the contact sulfuric acid process.

In the past catalytic apparatus provided with vertical catalyst compartments and a fluid temperature regulating medium, such as, for example, liquid baths or in some cases gaseous media has been made to present a large surface of catalyst tube as compared with the volume of catalyst and is thus suitable for reactions in which temperature control is a serious factor either because of the hightly exothermic character of the reaction or because of the delicacy of the temperature control required. In small converters no special circulating means for the temperature regulating fluid, either gas or liquid bath, is necessary as convection circulation from the tubes to the converter shell is sufficient in most cases to provide for adequate temperature control. In some cases in the past this circulation has been aided by agitating means. In order to avoid the difficulties due to inadequate circulation of the temperature regulating fluid a defined circulation from the catalyst tubes to an external cooling space and back is provided in the patent to J. M. Selden No. 1,647,317. When the principles of this patent are applied to converters with vertical catalyst-containing compartments a marked improvement in the circulation of the temperature regulating fluid is obtained, but even with this principle, difficulties arise when the diameter of converters exceed a certain point, as will be readily apparent when it is considered that any fluid circulating by convection tends to take the path of least resistance. In converters of large diameter even when provided with the necessary vertical baffles to separate the cooling chamber horizontally from the chamber surrounding the catalyst compartments and using the principles of circulation of the Selden patent there is a tendency, particularly in the case of liquid baths, for the temperature regulating fluid to flow up around the vertical catalyst compartments near the vertical baffles in the case of a converter using the circulation of the Selden patent or the converter shell itself in the case of a converter not provided with this circulation means and a relatively stagnant portion of bath is to be noted in the center of the converter. This stagnant zone becomes a serious matter when large converters are used, particularly where the evolution of heat is very great as, for example, in the catalytic oxidation of organic compounds, such as, for instance, the production of phthalic anhydride by the vapor phase catalytic oxidation of naphthalene and this has limited the size of converters using non-boiling baths to certain maximum diameters with a resultant increase in labor cost and equipment cost for a given output.

The present invention, which is in part a continuation of my co-pending applications Serial No. 275,044 filed May 4, 1928 and Serial No. 369,544 filed June 10, 1929, provides one or more horizontal baffles fitting sufficiently tightly around the vertical catalyst compartments so that the temperature regulating fluid cannot flow along the catalyst compartments through the baffle. It is thus possible to produce a positively defined circulation with the elimination of the hot spot in the center of large converters, which has been so serious a disadvantage in the past.

In its broader aspects the present invention is not limited to any particular design of horizontal baffle and includes, for example, baffles which extend from one converter wall nearly to the other converter wall and produce a crisscross circulation over the catalyst tubes as illustrated, for example, in Fig. 13 of my co-pending application Serial No. 124,569 filed July 24, 1926. This construction can be used both with gaseous and liquid temperature regulating fluids and also permits the use of different fluids in different vertical zones where such a differentiation is desired.

Figure 2:
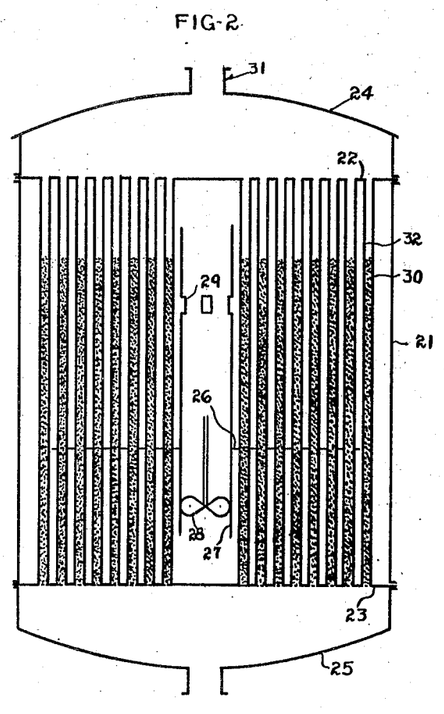
Fig. 2 is a converter provided with a bath and the single horizontal baffle centrally perforated.

In its more preferred modifications, however, the present invention as applied to converters with liquid baths utilizes one or more horizontal baffles which do not extend to the converter walls and which are provided with one or more openings in their center portions, with or without mechanical circulation means associated therewith. Such a baffle forces all of the bath to flow over the center tubes as well as those nearer the periphery and prevents hot-spot formation. A horizontal baffle with a central opening or openings alone gives very satisfactory results, particularly where a suitable mechanical circulating device is associated therewith and such a simple, centrally perforated, horizontal baffle is illustrated in Fig. 2 of the present application, which will be described in greater detail below.

Figure 5:
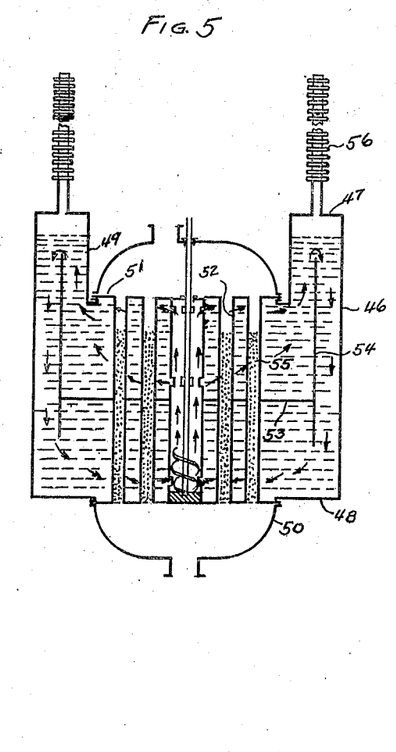
Fig. 5 illustrates a converter of the general type of Fig. 3 but provided with a bath which can be permitted to boil in emergencies.
Figure 6:
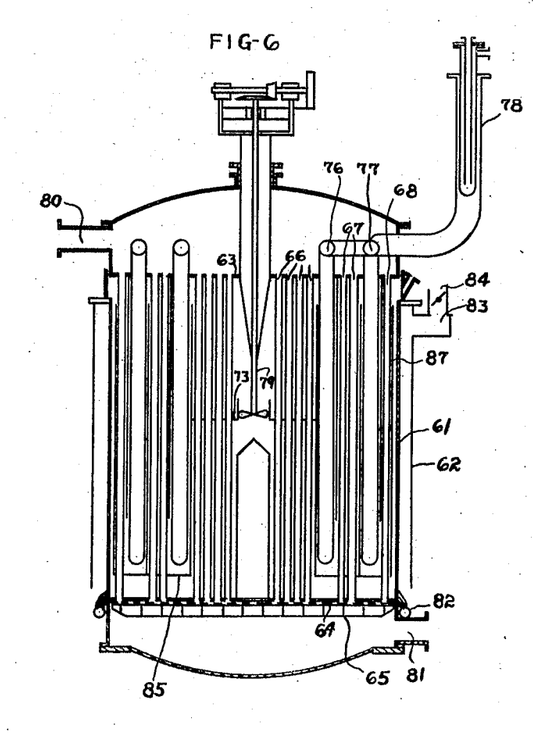
Fig. 6 is a compound converter combining the converter shell cooling features of Fig. 3 with the liquid temperature regulating compartment features of Fig. 4.

The centrally perforated horizontal baffles which form the preferred type of the present invention may be associated with one or more series of vertical baffles in order to combine the circulation features of the Selden patent referred to above with the horizontal baffle of the present invention. This combination is shown in a simple modification of Fig. 3, and more complex forms are illustrated in Figs. 4 to 6.

Tremendously effective converters can be produced with a single centrally perforated cross-baffle combined with the necessary baffles to obtain circulation from the catalyst tubes to a separate cooling compartment which is shown in the specific illustrations in the drawings as defined between the vertical baffles and the converter shell. Difficulty is, however, sometimes encountered in regulating the cooling through the converter shell which normally takes place by means of air or other gaseous medium passing over the outside of the shell. The heat capacity of the gaseous medium is low and where air is used, as is most commonly the case because of reasons of cheapness, the temperature of the air will vary with the season of the year and in any event regulation of relatively large amounts of flowing gas is necessary to compensate for differences in the course of the reaction. While this presents by no means an insuperable obstacle and a simple converter using the converter shell as cooling means can be used even for the most delicate reactions, it is advantageous in some cases to utilize most positive or more easily controlled temperature regulating means. Thus, for example, compartments containing liquids, especially liquids which boil and which, if desired, may boil at temperatures slightly below that to which it is desired to cool the circulating bath, may be placed in heat exchanging relation therewith either by incorporating them with the converter shell wall or by immersing them in the bath and preferably in the cooling compartment. In this way a more positive, and in the case of liquids boiling at about the desired temperature, automatic regulation can be obtained and converters of great effectiveness can be built by the use of this principle. It should be noted that the combination of boiling liquid temperature regulating compartments with a non-boiling circulating bath is not claimed broadly, this forming the subject matter of my co-pending application Serial No. 256,189 filed February 23, 1928, but is only claimed in the present application in combination with the horizontal baffle or baffles which forms the subject matter of the broad inventive idea in the present case.

Figure 4:
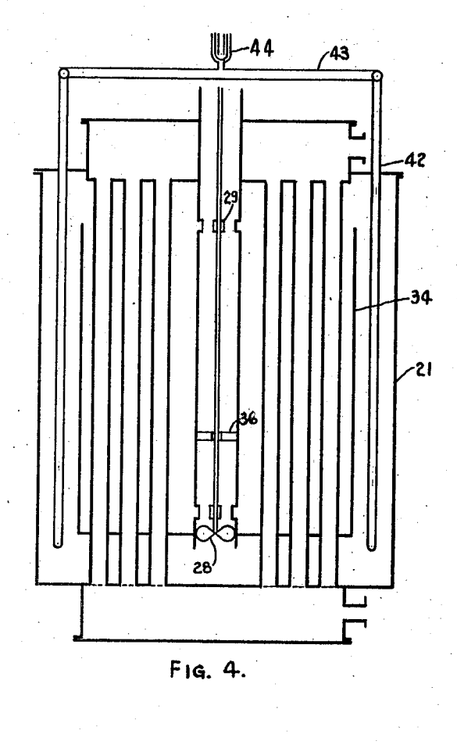
Fig. 4 is a converter of the general type of Fig. 3 but provided with liquid containing temperature regulating compartments in heat exchanging relation with the bath.
Figure 7:
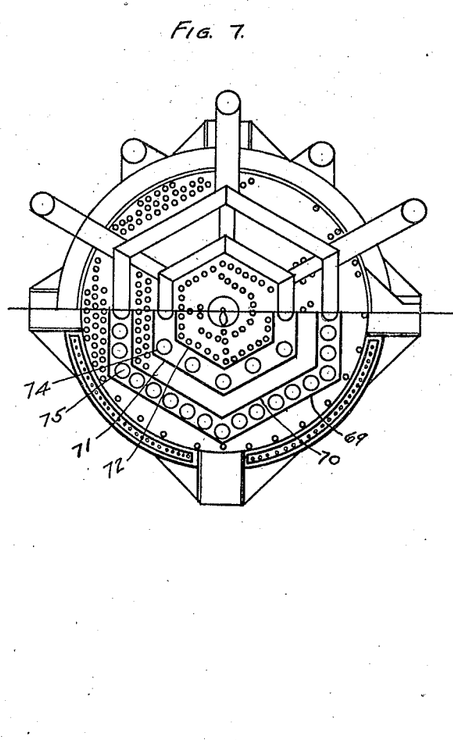
Fig. 7 is a horizontal section on the line 6—6 of Fig. 6.

Fig. 4 of the drawings illustrates a simple combination of liquid temperature control compartments which are shown, for example, as closed-end tubes but which may, if desired, be continuous conduits, especially where they are protected from dangers due to breakage. More complex combinations of air-cooling and cooling by means of liquid temperature regulating compartments in combination with a plurality of horizontal baffles are shown in Figs. 6 and 7, which represent a complex type of converter especially suitable for very large scale production of materials such as phthalic anhydride where the evolution of heat is very great and where a very positive bath circulation and temperature control is a prime consideration.

Instead of using boiling liquids in compartments to control bath temperature in combination with a horizontal baffle it is also possible in many reactions which tend to run away with themselves, as, for example, the oxidation of organic compounds, to employ a bath which boils at a temperature in excess of that normally encountered in normal operation of the converter but yet at a sufficiently low temperature to prevent damage to the apparatus and catalyst in case the reaction gets out of control. Such a bath, which may be considered as a safety valve, is illustrated in Fig. 5, and presents the further advantage that the bath is in a confined space and, therefore baths such as, for example, molten metal baths, as, for instance, lead, or alloys of mercury and lead, or mercury and cadmium, or mercury itself may be used, which materials tend to oxidize, and must, therefore, be kept under an indifferent atmosphere. The converters in Figs. 3, 4, 6 and 7 are shown as having baths open to the atmosphere, which is feasible in constructions where baths are used such as, for example, a eutectic mixture of sodium nitrate and sodium nitrite which are not attacked by oxygen. However, if it is desired to use a metal bath or one which is attacked by the atmosphere the converter types shown in these figures may be provided with suitable closing means which may advantageously be flexible in order to avoid putting strains on the tube sheets due to differential expansion of converter shell and catalyst compartments. Such flexible closures are not claimed in the present application per se, but form the subject matter of my co-pending application Serial No. 458,010, filed May 31, 1930, but it should be understood that they can be used with the converter designs of the present application and should be used wherever the nature of the bath makes it desirable. In fact the drawings in the present case are purely diagrammatic in nature, and most of the ordinary accessories such as insulation, temperature measuring instruments and the like have been omitted as they form per se no part of the present invention and any suitable type of accessory equipment will be used by the skilled engineer in building the apparatus or by the skilled chemist in operating it.

A number of modifications of the principles of the present invention have been shown in the above figures in order to describe as many features as possible, but it should be understood that the invention is not limited to the particular combination of the features shown in the individual figures. On the contrary one feature of one figure may be combined with features of other figures wherever such combination is desirable. Thus, for example, the use of compartments containing liquids as temperature regulating elements may be used in combination with a converter possessing horizontal baffles without vertical baffles as, for instance, in Figs. 1 and 2, and this feature is in no sense to be considered useful only with converters provided with both horizontal and vertical baffles, although for convenience it has been illustrated only in the figures embodying the latter combination.

In order to facilitate clearness of description, some of the drawings will be described as exemplifying organic oxidations, and especially the catalytic oxidation of naphthalene to phthalic anhydride, but it is to be understood that this is by way of example only, and that the invention can be applied in carrying out any reaction for which it is suitable, for example, those listed above.

The invention will be described in greater detail in connection with the drawings in which.

Figure 1:
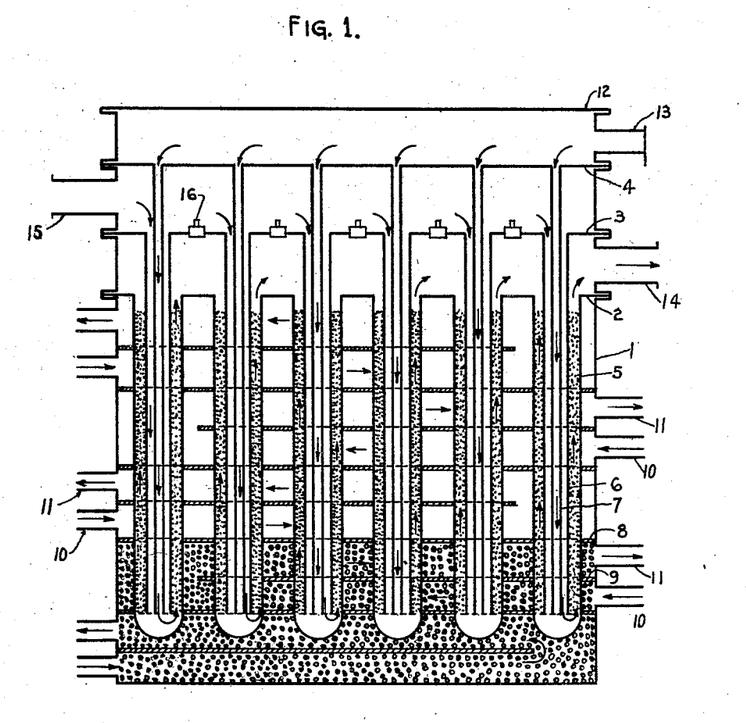
Fig. 1 is a converter provided with a plurality of horizontal baffles giving a crisscross circulation.

The converter shown in Fig. 1 consists of a converter shell 1, provided with three tubesheets 2, 3 and 4 from which extend respectively closed-end tubes 5 and open-end tubes 6 and 7, the tubes 7 extending into the tubes 6 which in turn extend into the tubes 5. Catalyst is arranged in the form of annuli between the open-end tubes 6 and the closed-end tubes 5, being held at the bottom by suitable screens as shown on the drawing. A series of horizontal baffles 8 extending across the converter in the space where the catalyst tubes are placed, divide it into a series of compartments, and horizontal baffles 9, which extend only part-way from alternate converter walls, provide for a crisscross circulation in each compartment. A series of cooling fluid inlet and outlet tubes 10 and 11 are provided and may be connected either to the same cooling fluid reservoir or to a different cooling fluid reservoir (not shown on the drawing). The flow of cooling medium in the different zones is shown by the arrows.

The converter top piece 12 defines with the top tubesheet 4 a reaction gas inlet space into which reaction gases enter through the pipe 13. Similarly the tubesheets 2 and 3 define a gas outlet space from which reacted gases pass out through the pipe 14. If desired additional reaction gas is admitted through the pipe 15 into the space defined between the tubesheets 3 and 4. Suitable plugs 16 are provided in the tubesheet 3 to facilitate introduction of catalyst.

In operation reaction gas is introduced either through pipes 13 or 15 or both or one component of the reaction gas can be introduced through the pipe 13 and the other through the pipe 15 and pass downwardly through the tubes 7 and 6 where they are preheated by the heat of the catalyst and thence pass up through the catalyst annuli and out through the pipe 14. Cooling fluid is introduced through the pipes 10, passing over the catalyst containing compartments and out through the tubes 11. If the cooling fluid or fluids are liquids the passage ways may be left open; if, however, gases are used it may be desirable to use filling bodies, for example of high heat conductivity in some or all of the passages, these filling bodies being illustrated at 16 in the lower two passage ways. If the same liquid is used in all the passage ways a uniform cooling takes place. If a different liquid or the same liquid at different temperatures is used in the different passage ways a vertical temperature gradient can be provided along the catalyst tubes permitting for example, a higher temperature in the first portions of the catalyst encountered by the reaction gases in the bottom of the closed tubes 5 and a lower temperature in the later portions of the catalyst, or with highly exothermic reactions a cooler liquid may be supplied to the lower portions of the catalyst in order to compensate for the greater evolution of heat in these portions. When a gaseous medium is used filling bodies may be provided in some of the passage ways and not in others in order to produce a more intense cooling or heating in one zone than in another. Of course, gases may be used in one zone and and liquids in another and any combination of the two arrangements may be used.

It should be noted that the horizontal baffles fit sufficiently tightly around the catalyst tubes to prevent vertical circulation through the baffle around the catalyst tubes and, therefore, no matter how large the converter is a positive flow of cooling medium or in the case of an endothermic reaction heating medium is assured over all of the catalyst tubes and no hot-spot can be formed in the center as is the case in converters which are not provided with horizontal baffles fitting snugly around the catalyst compartments. It should, however, be noted that in the figure the baffles 9 do not tightly fit around the furthest catalyst compartment. This is done in order to make the drawing more clear as it is diagrammatic in nature and the spacing of the catalyst compartments is, of course, exaggerated for purposes of clearness. Substantially, however, the baffle directs the flow of temperature regulating medium over the catalyst compartments without permitting an unrestricted or an insufficiently restricted vertical flow which would permit the formation of a hot-spot in the center. In practical operation, of course, a converted of the design shown in Fig. 1 would have the baffles 9 extend beyond the last catalyst compartment but such a drawing would render the direction of travel of the temperature regulating fluid unclear, and, therefore, the space between the end of the baffle 9 and the shell 1 is shown in an exaggerated form.

It will be noted that Fig. 1 corresponds to Fig. 13 of my co-pending application, Serial No. 124,569, filed July 24, 1926.

Fig. 2 shows a construction in which a different modification of the horizontal baffle is used to direct the flow of currents generated in the bath. The body of the apparatus consists of a converter shell 21 with top and bottom pieces 24 and 25 and upper and lower tube sheets 22 and 23, between which extend catalyst tubes 30. A horizontal baffle 26 is connected at its central portion with a central tube 27, which forms a well, within which a propeller 28 may be placed, if desired, to control the circulation. The tube 27 is provided with openings 29 above the baffle, in order to permit the flow of currents within the cooling liquid. The bath liquid gives off the heat taken up from the catalyst tubes through the converter shell and flows downwardly along it as it is cooled. The baffle 26 directs the flow along the converter walls and across the catalyst tubes beneath it, and the liquid heated by contact with the lower portions of the tubes rises in the central well 27, passes through the openings 29 and extracts more heat from the upper portions of the tubes 30. A continuous recirculation of the liquid along the converter shell and over the catalyst tubes is thus obtained, and an even temperature gradient is maintained in the catalyst tubes without the sharp variations that would result from the use of a number of horizontal compartments.

The incoming reaction mixture, which may consist of a mixture of naphthalene and air, may enter the converter at 31 and pass downwardly through the catalyst 32 in the tubes 30, and the reaction gases leave the converter at the bottom, although under some circumstances it may be found desirable to pass the reaction mixture in the reverse direction. The dissipation of heat from the converter shell 21 and the accompanying circulation of the bath liquid may be assisted by a surrounding air jacket, which causes a draft of air or through cooling medium to circulate over the converter shell and maintain a more positive and even cooling.

Figure 3:
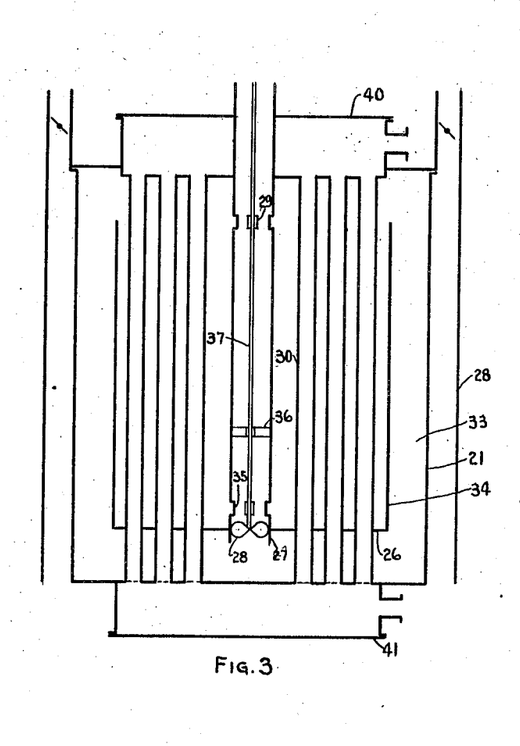
Fig. 3 is a converter provided with a centrally perforated baffle combined with a cylindrical vertical baffle providing circulation from the catalyst zone to a separated cooling zone.

The construction of Fig. 3 shows a converter where an even more uniform distribution of a circulating bath is obtained by applying to the horizontal baffle construction the principle of a defined circulation, as described in the J. M. Selden patent referred to. In this modification the horizontal baffle 26 is connected to a circular vertical baffle 34 which defines with the converter shell 21 a cooling chamber 33, and the central well 27 is provided with openings 35 at the bottom in addition to the openings 29 at the top. The openings 35 are placed just above the horizontal baffle, an extension of the central tube 27 being provided for a propeller if desired, and the bath liquid forced through the openings 35 passes upwardly along the catalyst tubes 30 and flows over the top of the vertical baffle into the cooling chamber. Above the outlets 35 the central well 27 is closed by means of the circular plate 36, which can also be used as a support for the bearings of the propeller shaft 37. Above the circular plate 36 bath liquid is admitted through the inlets 29 in order to equalize the pressure on the walls of the central well.

The action of the outer temperature regulating chamber 33 is the same as that of the similar chamber in the Selden patent; that is to say, the liquid flowing into it over the top of the vertical baffle 34 passes downwardly along it and gives off its heat through the outer shell. Positive control of the cooling action of this chamber may be obtained by means of the air jacket 28, which surrounds the converter shell 21, the flow of the cooling air being controlled by adjustment of the dampers 39, or the cooling may be controlled by means of closed-end tubes containing liquids which boil at or below the normal temperature of the bath liquid immersed in the liquids in this chamber, as also described in Fig. 4.

The flow of the temperature regulating bath is upwardly along the catalyst tubes 30 and downward between the vertical baffle 34 and the converter shell 21, this being its natural direction of flow, since the liquid which has acquired additional sensible heat in taking up the exotherm of the reaction in the tubes 30 tends to rise in this portion of the converter, while the liquid which is cooled in the chamber 33 tends to fall, and is forced by its own weight horizontally under the baffle 26. This action may be assisted or controlled by the propeller 28, and in many cases it will be found that the supplementary propelling means is unnecessary and that the thermo-syphon action of the liquid is entirely sufficient, and it is to be understood that the invention is not limited to modifications in which the circulation is maintained by mechanical propelling means.

The incoming reaction gas mixture, consisting of a mixture of naphthalene and air, may pass in either direction through the catalyst tubes, but is preferably admitted into the upper manifold 40 and made to pass downwardly through the catalyst, the reacted gases leaving at 41. When the gases are passed in this direction a uniform temperature gradient can be maintained throughout the catalyst in the tubes, since the portion of the bath having the lowest temperature is that surrounding the lower portions of the tubes 30 and the liquid rises as it is heated.

The modification of Fig. 4, is the same type of converter structure as that of Fig. 3 with the exception that a closer temperature regulation and a more powerful bath cooling is maintained by means of the closed end tubes 42, which are in the separate cooling compartment 33 between the outer shell 21 and the vertical baffle 34. These tubes are connected together by means of an upper manifold 43, and contain a liquid which boils at or below the bath temperature and conducts away the heat not removed through the converter shell as latent heat of vaporization. The vapors are condensed in the refluxes 44 and returned.

It is to be understood that in any of the preceding modifications the bath liquid may be of various types. It may consist of a molten metal or of an alloy, or of a salt, or a mixture of salts, such as the nitrate-nitrite mixture referred to. The character and boiling point of the bath liquid will of course depend upon various conditions, such as the nature of the reaction and the size of the apparatus, as well as on the type of cooling means to be used.

Fig. 5 shows a construction which is primarily designed for the use of metals or metal alloys which would corrode if exposed to the air, but which also exemplifies a construction which is of great utility with bath liquids, either corroding or non-corroding, having boiling points only slightly above the normal reaction temperatures. In this construction the circulating bath is completely enclosed by means of the converter shell 46, the upper annulus 47, the lower annulus 48 which is attached to the lower tube sheet 50, and the inner shell 49 which is attached to the upper tube sheet 51. The catalyst tubes 52 extend between the upper and lower tube sheets in the usual manner, and the horizontal and vertical baffles 53 and 54 operate to direct the flow of the bath liquid similarly to those which have been described. The upper level of the bath liquid is maintained at a considerable height above the level of the catalyst 55 in the tubes, so that the bath liquid which is taking up heat from the catalyst is always under considerable hydrostatic pressure. In this manner a bath liquid which has a boiling point under normal conditions close to the reaction temperature can be caused to recirculate, for a slight increase in reaction temperature will not be sufficient to cause the liquid to boil, while sharp rises in the catalyst temperatures will cause boiling of the circulating liquid at its upper portions and consequent removal of the excess heat as latent heat of vaporization. Any vapors so formed are condensed in the refluxes 56 and returned to the bath. It is of course understood that in actual operation this converter will be surrounded by a cooling jacket, such as is shown in Fig. 3, this feature having been omitted for clearness of disclosure.

In the modification of Figs. 6 and 7 two sets of closed end tubes 74 and 75 are used which are set concentrically between alternate sets of catalyst tubes 66, 67 and 68.

The converter consists of a shell 61 with bottom and top pieces and lower and upper tube sheets 63 and 64. This shell is provided with reaction gas inlet 80 and outlet 81 and is surrounded by an air cooling jacket 62, which is provided with gas burners 82 around the circumference of the converter to heat the bath when starting up and with flues 83 controlled by dampers 84. Within the shell 61, supported by the tube sheets, are arranged series of catalyst tubes 66, 67 and 68, between which is suspended a baffle structure which may be of any shape, but which is shown as hexagonal in cross-section. These baffles are suspended from the upper tube sheet 64 and consist of side walls 70 and 72 and bottom walls 85. Within the baffles are mounted rows of tubes 74 and 75 which are closed off at their bottoms and connected at their upper ends to manifolds 76 and 77 which lead to condensers 78 and are designed to contain a liquid which boils below the reaction temperature. Any number of baffle structures may be arranged concentrically, two being shown on the present drawings. The mechanical circulation of the bath is effected by the propeller 79 which fits sufficiently closely in the baffle 73 to provide for satisfactory circulation.

When the converter is used for the oxidation of naphthalene to phthalic anhydride, the catalyst tubes 66, 67 and 68 are filled partly or wholly with a phthalic anhydride catalyst, this being supported at the bottom by means of a screen which is in turn supported by the screen supporter 65. A vaporized mixture of air and naphthalene, having, for example, a ratio of 18 liters of air per gram of naphthalene, enters through the inlet 80 at a temperature of about 150–160° C. The reaction gases passing through the upper portion of the catalyst tubes 66, 67 and 68 are preheated to reaction temperature by the heat of the bath. The heat generated in the catalyst tubes is transferred to this liquid and causes it to rise in the spaces surrounding the tubes, the propeller 79 situated at the center of the converter supplementing the action if necessary. The rising liquid overflows the baffles 72 and 70 and comes in contact with the tubes 74 and 75 which contain the liquid adapted to boil below reaction temperatures. The excess heat contained in the circulation liquid is taken up by the boiling liquid in these tubes as latent heat of vaporization and the circulating liquid so cooled descends between the hexagonal baffles and escapes under the walls 71 and 69, thereby coming into contact with other sets of catalyst tubes. Here it absorbs more reaction heat and once more rises. When the rising liquid overflows the outer baffle 87, it comes into contact with the shell of the converter which is air cooled as has been described. It then descends between the baffle 87 and the converter shell and passes beneath the bottoms 85 of the baffles and again comes in contact with the central catalyst tubes. This cycle is repeated and an extremely efficient cooling of the catalyst tubes results since the flow of liquid is always along the tubes instead of across them and a maximum efficiency of heat transfer is thereby made possible.

It is preferable to pass the gases from the top to the bottom of the catalyst tubes, as normally the highest reaction temperature is in the portions of the catalyst which encounter the fresh reaction gases and, therefore the flow from the top to the bottom gives the most effective heat gradient and permits absorption of heat by the bath. However, so efficient is the cooling of the bath in converters of the present invention that it is feasible to pass the gases from the bottom to the top of the catalyst tubes. This is of advantage in some reactions which are extremely sensitive as the greatest heat head and correspondingly the most vigorous cooling is encountered in the portion of the catalyst which is struck by the fresh gases. Preheating is, however, by no means as effective when the gases are circulated from the bottom to the top as the lower portions of the bath are, of course, below the temperature at which the end of the reaction takes place. In most catalyses, however, this is not serious as the catalyses will usually begin at temperatures considerably below those for maximum conversion and the heat evolved in the catalyst rapidly brings the latter up to reaction temperature, for the catalyst is at all points where vigorous reaction takes place considerably hotter than the bath.

It should be understood that the terms "boiling", "non-boiling" and "boiling point" are used in the specification and claims to refer to the various liquids under their actual operating conditions and are not intended to define absolute properties of the substances employed. Thus, for example, it is apparent that in the modifications of Figs. 4 or 6 the same substance under suitable conditions of pressure or vacuum could be used both as a boiling and as a non-boiling liquid, it being only necessary to place the circulating bath under sufficient pressure or the closed end tubes under sufficient vacuum.

The feature of bath agitators operating in a vertical well shown in Figs. 2 to 5 and 7 are described and illustrated in Figs. 11 and 12 of my co-pending application, Serial No. 124,569 above referred to.

What is claimed as new is:

1. A catalytic converter for carrying out catalytic vapor phase reactions comprising in combination a substantially vertical converter shell, substantially vertical catalyst containing compartments therein, a liquid bath medium in said converter surrounding the catalyst compartments and at least one substantially horizontal baffle fitting around the catalyst compartments, said baffle being provided with at least one central opening and with openings permitting vertical flow of bath fluid along the periphery of the converter shell wall but fitting sufficiently tightly around said catalyst-containing compartments to substantially prevent vertical flow of bath through the baffle at points other than its central and peripheral portions.

2. A converter according to claim 1 in which means are provided for positive circulation other than that due to convection.

3. A catalytic converter for carrying out catalytic vapor phase reactions comprising in combination a substantially vertical converter shell, substantially vertical catalyst containing compartments therein, a liquid bath medium in said converter surrounding the catalyst compartments, at least one substantially horizontal baffle fitting around the catalyst compartments, and provided with at least one centrally located opening, at least one vertical baffle connecting with said horizontal baffle and separating the catalyst compartment zone of the converter from the converter shell, said baffles permitting flow of bath from the catalyst zone to the converter shell at its upper portion and the reverse flow at its lower portion, the horizontal baffle fitting sufficiently tightly around the catalyst containing compartments to substantially prevent vertical flow of bath through the baffle at points other than its central and peripheral portions.

4. A converter according to claim 3 in which means are provided for positive circulation of the bath other than that due to convection.

5. A converter according to claim 1, in which a normally non-boiling bath is used and at least a portion of said bath is in heat exchange relation with at least one temperature regulating element containing at least one liquid other than that of the bath itself.

6. A converter according to claim 1, in which a normally non-boiling bath is used and at least a portion of said bath is in heat exchange relation with at least one temperature regulating element containing at least one liquid which boils at a temperature below the temperature of the bath during normal operation.

7. A converter according to claim 3, in which a normally non-boiling bath is used and at least a portion of said bath is in heat exchange relation with at least one temperature regulating element containing at least one liquid other than that of the bath itself.

8. A converter according to claim 3, in which a normally non-boiling bath is used and at least a portion of said bath is in heat exchange relation with at least one temperature regulating element containing at least one liquid which boils at a temperature below the temperature of the bath during normal operation.

9. A catalytic converter according to claim 3, in which at least one temperature regulating element containing at least one liquid other than the bath liquid itself is in heat exchange relation with the portion of the bath in the space defined between the vertical baffle and the converter shell.

10. A catalytic converter according to claim 3, in which at least one temperature regulating element containing at least one liquid boiling at a temperature below that of the bath under normal operating conditions is in heat exchange relation with the portion of the bath in the space defined between the vertical baffle and the converter shell.

Signed at Pittsburgh, Pennsylvania, this 31st day of January, 1930.

ALPHONS O. JAEGER.